(12) United States Patent
Jane Santamaria

(10) Patent No.: US 7,455,354 B2
(45) Date of Patent: Nov. 25, 2008

(54) DEVICE FOR THE ARTICULATED LINKING OF HANDLES TO INFANT SEATS, CARRYCOTS AND THE LIKE

(75) Inventor: Manuel Jane Santamaria, Palau De Plegamans (ES)

(73) Assignee: Jane, S.A., Barcelona (ES)

( * ) Notice: Subject to any disclaimer, the term of this patent is extended or adjusted under 35 U.S.C. 154(b) by 0 days.

(21) Appl. No.: 11/726,110

(22) Filed: Mar. 20, 2007

(65) Prior Publication Data

US 2007/0284921 A1 Dec. 13, 2007

(30) Foreign Application Priority Data

Mar. 31, 2006 (ES) .............................. 200600756 U

(51) Int. Cl.
*A47D 13/02* (2006.01)

(52) U.S. Cl. .................................. 297/183.4; 297/183.3

(58) Field of Classification Search .............. 297/183.2, 297/183.3, 183.4, 250.1
See application file for complete search history.

(56) References Cited

U.S. PATENT DOCUMENTS 4,516,806 A * 5/1985 McDonald et al. ..... 297/452.13
4,634,177 A * 1/1987 Meeker .................. 297/256.13
5,244,292 A * 9/1993 Wise ........................ 297/183.3
5,522,639 A    6/1996 Jaime
6,145,927 A * 11/2000 Lo ............................ 297/250.1
6,715,828 B1 * 4/2004 Cheng ..................... 297/183.3
6,913,313 B2 * 7/2005 Sedlack ................... 297/183.4

FOREIGN PATENT DOCUMENTS

EP    1437285 A2    7/2004
ES    1053703       5/2003

\* cited by examiner

*Primary Examiner*—Peter R. Brown
(74) *Attorney, Agent, or Firm*—Merchant & Gould P.C.

(57) ABSTRACT

The handle is made up by a rigid element having the shape of an inverted U and being fit to be articulatedly linked to the sides of the infant seat or carrycot. This device includes a locking element to lock the different positions of the handle and to be actuated by a rope. This device has two portions (1 and 2), of which portion (1) houses the locking element (5) being formed by a tiltable part, and portion (2) has the device on which said locking element (5) carries out its locking action, the device is made up by teeth (9) being formed on the periphery of a central hub (10). The locking element (5) is formed by a part having an angular end (6) and tilted in an angular (8) cavity (7) having a wider expanse and being provided in the first portion (1) of the device, the locking element having a U-shaped protuberance (5') being fit to selectively engage one of the aforementioned teeth (9).

2 Claims, 1 Drawing Sheet

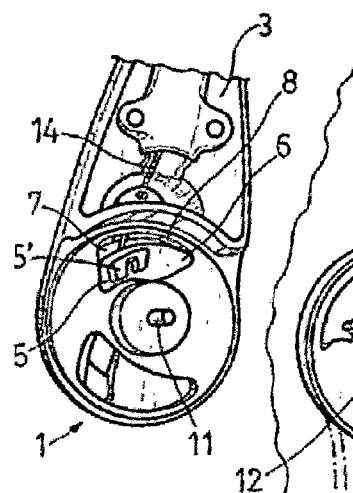
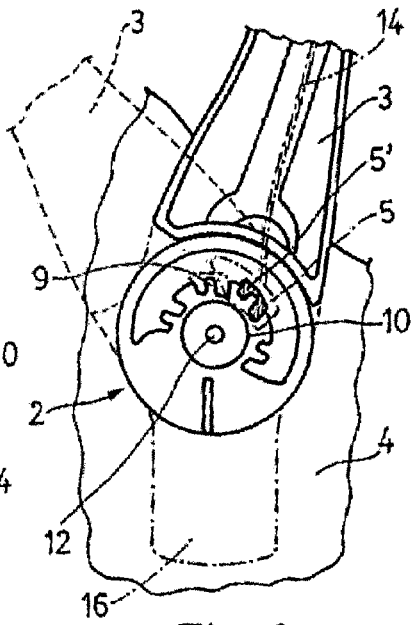
Fig. 1    Fig. 2
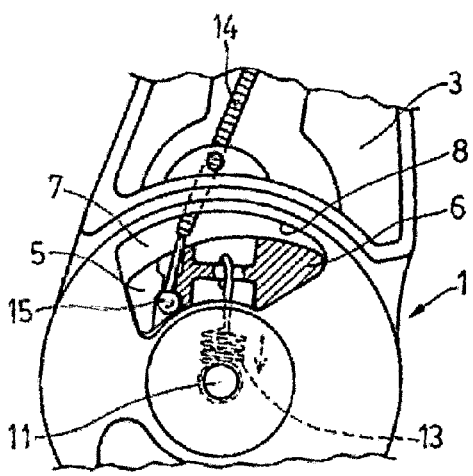
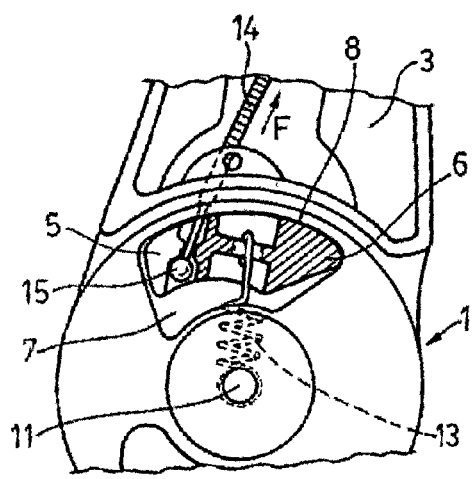
Fig. 3    Fig. 4

DEVICE FOR THE ARTICULATED LINKING OF HANDLES TO INFANT SEATS, CARRYCOTS AND THE LIKE

A device for the articulated linking of handles to infant seats, carrycots and the like.

BACKGROUND OF THE INVENTION

Infant seats and the like have been for some time now comprising the articulation of a rigid handle having the shape of an inverted U and being fitted to the sides of the seat in such a way that it can be locked in different positions within its turning range by means of the aforementioned articulation, said articulations having a device allowing to lock and unlock the different positions of the handle.

Some of these devices comprise a locking element being fit to be slidingly shifted between two coaxial cavities, one of these latter corresponding to the side of the infant seat and the other one corresponding to the lower end of the handle, a pushbutton acting on the locking element and being fit to compress a spring being fit to cause the locking means to return to the passive position when ceasing to exert pressure on the pushbutton, such as in the case of the device being the object of the Utility Model ES-1 053 703 U (Appln. No. 200300028).

Other devices have the locking elements being actuated by a rope by means of a single control being placed at the upper portion of the handle, the locking elements being made up by a shiftable part being adapted to fit into different recesses being provided in a bushing, such as in the case of the infant seat with handle being the object of U.S. Pat. No. 5,522,639.

SUMMARY OF THE INVENTION

This invention has as its object a device being provided for the articulated linking of handles to infant seats, carrycots or the like, having an efficient and simple make-up and being fit to be easily actuated by means of a rope.

This device is characterized in that it comprises two portions, a first one housing the locking element being formed by a tiltable part, and the second one having the means on which said locking element carries out its locking action, said means being made up by teeth being formed on the periphery of a central hub.

An also characterizing feature lies in the fact that the locking element is formed by a part having an angular end and being fit to be tilted in an angular cavity having a wider expanse and being provided in the first portion of the device, said locking element having a U-shaped protuberance being fit to selectively engage one of the aforementioned teeth.

The first portion of the device has a transverse pin by whose means it is fit to turn on the second portion, the locking element being linked to said pin by means of a spring pulling said locking element towards its active position.

These and other characterizing features will be best made apparent by the following detailed description whose understanding will be made easier by the accompanying sheet of drawings showing a practical embodiment being cited only by way of example not limiting the scope of the present invention.

DESCRIPTION OF THE DRAWINGS

In the drawings:

FIG. 1 illustrates the device being the object of the invention, the two portions forming it being shown in a separated arrangement;

FIG. 2 shows in an elevational view the operation of the locking element; and

FIGS. 3 and 4 diagrammatically illustrate in an elevational view the active position and the passive position of the locking element, respectively.

DETAILED DESCRIPTION

According to the drawings the illustrated device for the articulated linking of handles to infant seats, carrycots and the like consists of two portions (1) and (2), the first one of them being solid with the lower end of the handle (3), and the second one being solid with the seat (4) or the like.

The first portion (1) houses the locking element (5) being formed by a tiltable part having an angular end (6) and being fit to be tilted in a cavity (7) being provided in said first portion (1) and having an angular end region (8) having a wider expanse as compared with the end (6) of the tiltable part.

In the second portion (2) of the device the means have been provided on which the locking element (5) exerts its locking action, said means being made up by teeth (9) being formed on the periphery of a central hub (10).

The part (5) has a U-shaped, lateral protuberance (5') being fit to selectively engage one of the teeth (9).

The first portion (1) has a transverse pin (11) by whose means it is fit to turn on the fixed second portion (2), this second portion for such a purpose having a central cavity (12) in which the aforementioned pin (11) is fit to turn.

The locking element (5) is stabilized in its active position (FIG. 3) because of being pulled by a helical spring (13) being secured at one end to said element and at the other end to the pin (11).

In order to change the position of the handle the locking element (5) will be actuated by means of a rope (14) (arrow F) being secured at its lower end (15) to said locking element (5) (FIG. 4) and extending through the inside of the handle, this latter thereby being in a position to be freely turned, and once said handle has assumed the new position and when ceasing the action being exerted on the rope (14) the spring will then cause the locking element (5) to return to its active position.

This device comprises complementary means (16) being linked to the first portion (1) for removably fitting the seat or the like to the corresponding baby carriage.

The invention claimed is:

1. A device for the articulated linking of a handle to an infant seat, a carrycot and the like, the handle having a rigid element having the shape of an inverted U and being fit to be articulatedly linked to the sides of the infant seat or carrycot, the device comprising a locking element to lock at different positions the handle and to be actuated by a line; wherein the device comprises two portions, the first portion housing the locking element, said locking element comprises a tiltable part, said line being connected to said locking element, and the second portion having means on which said locking element carries out its locking action, said means comprising teeth formed on the periphery of a central hub; wherein the first portion has a transverse swivel pin to turn on the second portion, wherein a spring connects the swivel pin to the locking element and biases said locking element to tilt the locking element about the swivel pin towards engagement with the teeth.

2. A device for the articulated linking of a handle to an infant seat, a carrycot and the like, the handle having a rigid element having the shape of an inverted U and being fit to be articulatedly linked to the sides of the infant seat or carrycot, the device comprising a locking element to lock at different positions the handle and to be actuated by a line: wherein the device comprises two portions, the first portion housing the locking element being formed by a tiltable part, and the second portion having teeth formed on the periphery of a central hub on which said locking element carries out its locking action;

wherein the locking element is formed by a part having an angular end and tilted in an angular cavity having a wider expanse and being provided in the first portion of the device, said locking element having a U-shaped protuberance to selectively engage one of the teeth.

* * * * *